Inventors
Thomas Charles Felix Stott
& Mario Joseph Maina
BY
*a. M. Heiter*
Attorney Jan. 23, 1968    T. C. F. STOTT ET AL    3,365,039
POSITIVE-CLUTCH SYNCHRONISER MECHANISM
Filed April 23, 1965    4 Sheets-Sheet 2

Inventors
Thomas Charles Felix Stott
& Mario Joseph Maina
BY
a.m. Heiter
Attorney

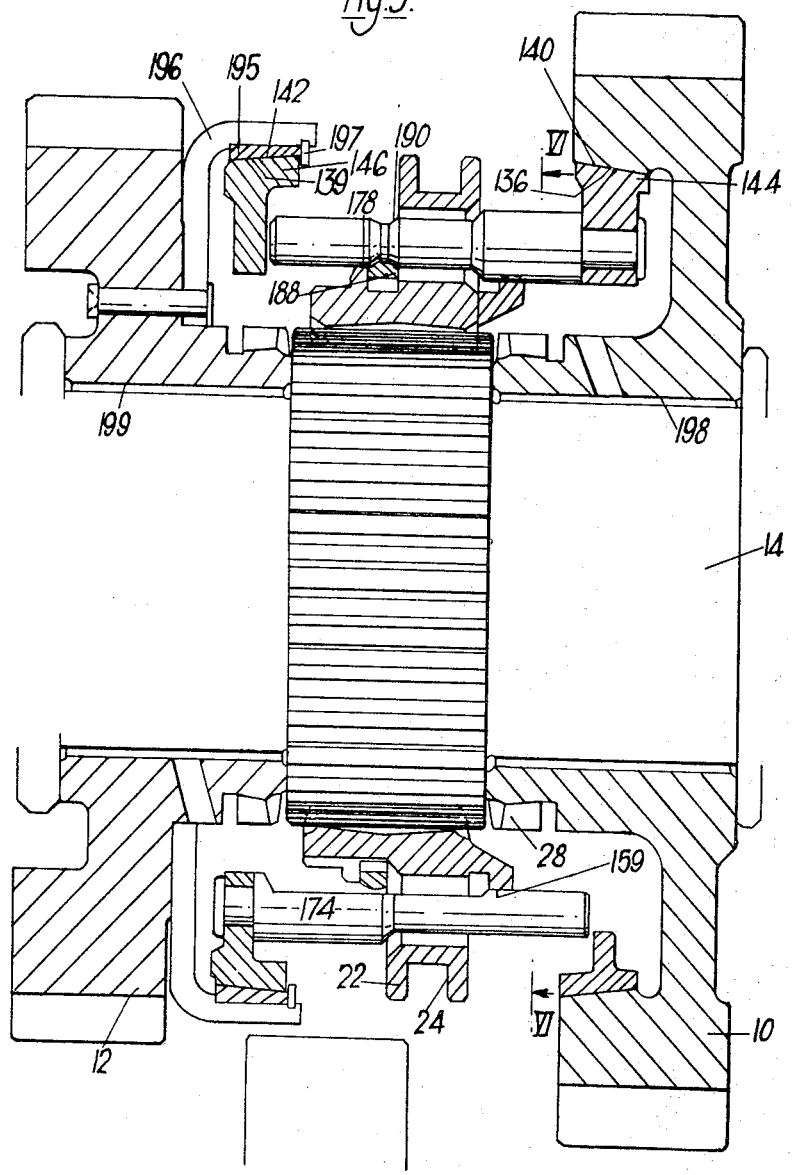

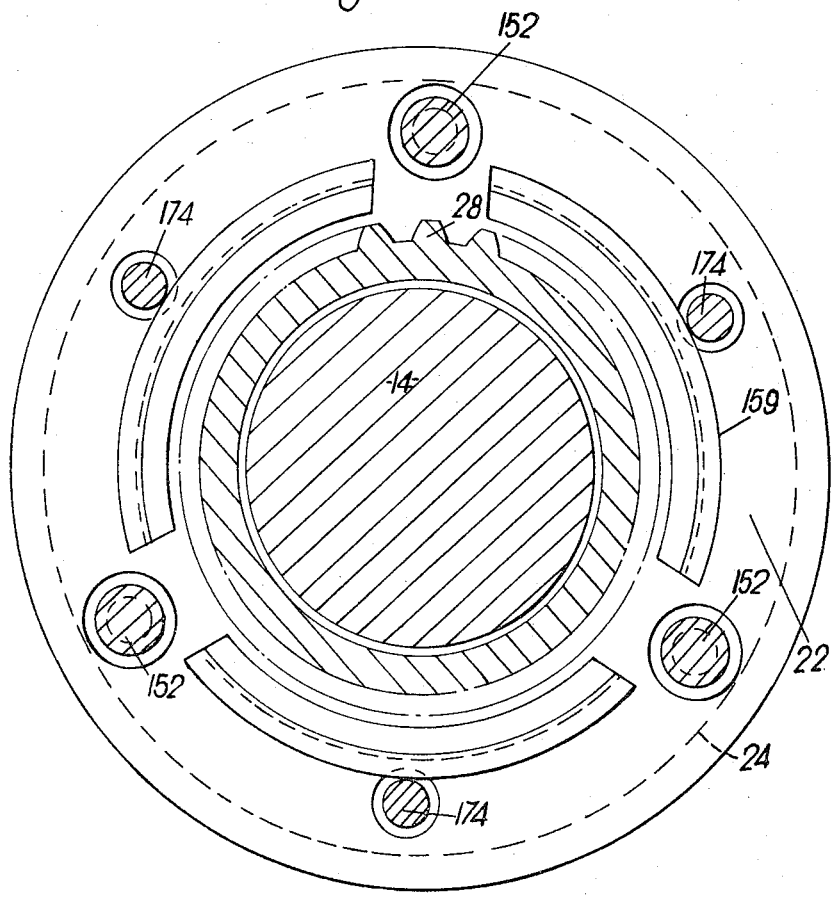

United States Patent Office 3,365,039
Patented Jan. 23, 1968

3,365,039
POSITIVE-CLUTCH SYNCHRONISER MECHANISM
Thomas Charles Felix Stott, Harpenden, and Mario Joseph Maina, Luton, England, assignors to General Motors Corporation, a corporation of Delaware
Filed Apr. 23, 1965, Ser. No. 450,413
Claims priority, application Great Britain, May 9, 1964, 19,430/64
10 Claims. (Cl. 192—53)

ABSTRACT OF THE DISCLOSURE

A constant mesh transmission having a synchroniser mechanism to effect selected initial synchronisation and subsequent positive clutching of either of two gears and a rotatable drive shaft. First and second synchroniser clutch rings have separate sets of baulk pins which extend through corresponding openings in a shiftable positive clutching sleeve splined to the drive shaft. One set of pins operates to block axial movement of the positive clutching sleeve in one direction. The other set of pins provides for energisation of either ring as well as a sleeve blocking function in an opposite direction. The sleeve and latter set of pins are connected by a yieldable spring which transmit and apply force to a selected synchroniser ring causing clutching engagement of the synchroniser ring and the gear being selected. After the selected synchroniser ring has been energized, sleeve movement is blocked by contact of blocking shoulders on one of the sets of pins and the sleeve until synchronisation of the selected gear and drive shaft occurs. After synchronisation, the sleeve can be axially moved relative to the blocking pins past the blocking shoulders into positive clutching engagement with the selected gear.

---

This invention relates to clutch coupling arrangements having positive-clutch synchroniser mechanisms for example clutch coupling arrangements in which a double-acting positive-clutch coupling sleeve is to be brought into synchronous engagement with a selected one of a pair of driven gear wheels in a constant-mesh gearbox of a motor vehicle.

According to the present invention, a clutch coupling arrangement comprises a clutch coupling sleeve axially slidable into positive engagement with a selected one of a pair of rotatable gearwheels disposed adjacent the respective axial ends of the coupling sleeve, first and second synchroniser rings each having a frustoconical surface for frictional engagement with a corresponding frustoconical surface on the respective gearwheel, a first set of shouldered baulk pins which extend axially from the first synchroniser ring into corresponding ones of a first set of shouldered recesses in the coupling sleeve, a second set of shouldered baulk pins which extend axially from the second synchroniser ring through corresponding ones of a second set of shouldered recesses in the coupling sleeve into abutting engagement with the first synchroniser ring, and a detent spring yieldably interconnecting the coupling sleeve and the second set of baulk pins for the transmission of a limited axial load from the coupling sleeve to the baulk pins.

In this manner means are provided for initially loading either the first or second synchroniser ring, depending on the axial direction in which the coupling sleeve is moved.

Preferably the detent spring is a circular spring which is disposed in an annular groove in the coupling sleeve and extends into a V-section groove in each of the second set of baulk pins.

The first set of baulk pins are advantageously so shaped and positioned as to be clear of the detent spring. For example these baulk pins may be of lesser diameter than the baulk pins of the second synchroniser ring, or may have a flat portion which provides the desired clearance. Rotation of the baulk pins may be prevented by deforming part of a head portions of each pin into a peripheral groove formed in the adjacent face of the synchroniser ring.

The two sets of shouldered recesses are preferably arranged symmetrically and in alternating sequence around the clutch coupling sleeve, thereby giving a balanced arrangement.

Preferably a free end portion of each baulk pin engages an internal or external guide surface on the clutch coupling sleeve, thereby assisting alignment of the frustoconical surfaces of the synchroniser rings during frictional engagement with the corresponding surfaces on the respective gearwheels.

The scope of the invention is defined by the appended claims; particular embodiments of the invention and their operations are hereinafter particularly described with reference to the accompanying drawings, in which:

FIGURE 5 is a longitudinal section similar to FIGURE 1 but of another embodiment of the clutch coupling arrangement according to the invention; and FIGURE 6 is a transverse section on the line VI—VI of FIGURE 5, in the direction of the arrows.

The embodiment of the clutch coupling arrangement shown in FIGURES 1 to 4 will now be described by way of example in relation to the second and third ratio gearwheels of a five forward speed and reverse constant-mesh gearbox for a motor vehicle. In the constant-mesh gearbox, as is conventional and accordingly not illustrated, drive from an input shaft is taken by way of transfer gears to a layshaft which is parallel to the input shaft and carries a number of gearwheels in constant mesh with corresponding gearwheels which are freely mounted on a mainshaft coaxial with the input shaft and can be selectively clutched to the mainshaft to cause rotation of the mainshaft at the speed of the selected gearwheel. Also, a direct-drive ratio is obtainable by clutching the mainshaft directly to the input shaft, and a reverse ratio is obtainable by the use of an idler gear interposed between respective gearwheels on the mainshaft and layshaft.

Figure 1:
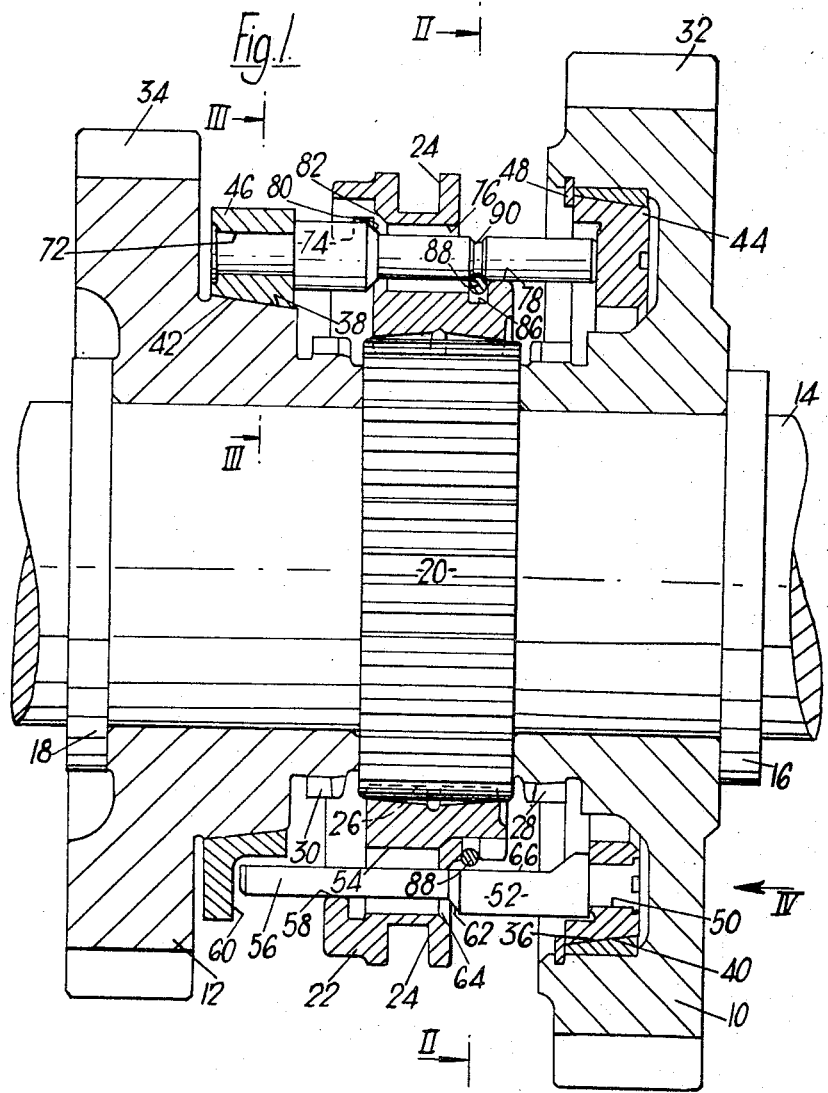
FIGURE 1 is a longitudinal section, with some parts in elevation, of one embodiment of a clutch coupling arrangement according to the invention.
Figure 3:
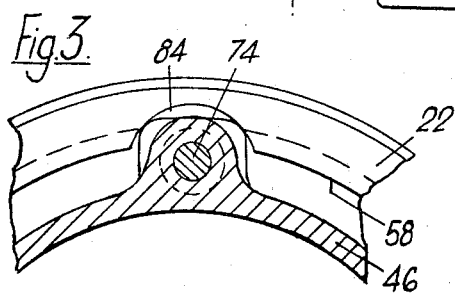
FIGURE 3 is a partial section on the line III—III of FIGURE 1, in the direction of the arrows.
Figure 2:
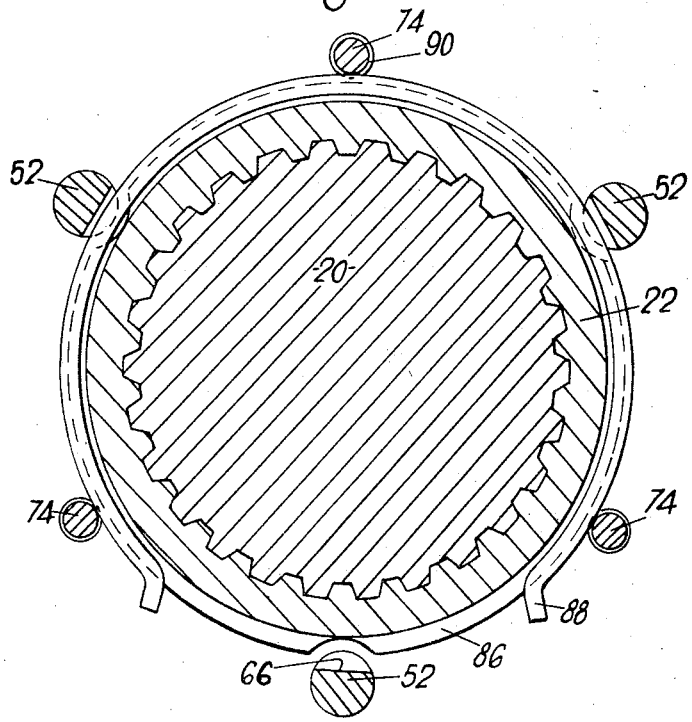
FIGURE 2 is a transverse section on the line II—II of FIGURE 1, in the direction of the arrows.
Figure 4:
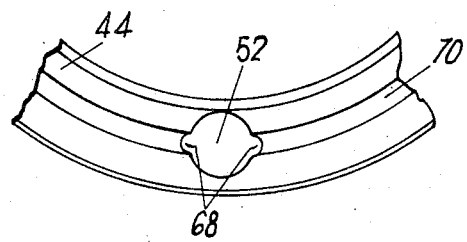
FIGURE 4 is a view in the direction of the arrow IV in FIGURE 1.

As is shown in FIGURE 1, the second and third ratio gearwheels 10 and 12 are freely mounted on the gearbox mainshaft 14 for independent rotation relatively thereto, and are restrained from axial movement away from one another by flange portions 16 and 18 of the mainshaft. The second and third ratio gearwheels are restrained from axial movement towards one another by an axially splined flange portion 20 of the mainshaft, on which is mounted an internally splined clutch coupling sleeve 22. The clutch coupling sleeve has an external peripheral groove 24 for the reception of a conventional axially slidable selector fork (not shown) by means of which the coupling sleeve may be slid axially to move the internal splines 26 of the coupling sleeve selectively into positive engagement with complementary external dog teeth 28 and 30 on the adjacent portions of the respective gearwheels 10 and 12.

Each of the second and third ratio gearwheels 10 and 12 also has, between the gear teeth 32 and 34 and the dog teeth 28 and 30 of the respective gearwheel, a frustoconical surface 36 and 38 corresponding to, and frictionally engageable by, a frustoconical surface 40 and 42 on a respective one of a pair of synchroniser rings 44 and 46. The synchroniser rings have a short axial length in relation to their diameter. Excessive movement of the synchroniser ring 44 for the second ratio gearwheel 10 in the axial direction away from the gearwheel is restrained by a circlip 48. Three circular apertures 50 arranged symmetrically around the synchroniser ring 44 for the second ratio gearwheel serve for the reception of head portions of respective ones of a first set of baulk pins 52 which have shank portions extending axially into and through corresponding ones of a first set of recesses 54 in the clutch coupling sleeve 22. The free end portion 56 of each of the first set of baulk pins on the other axial side of the recess 54 engages a circumferentially extending internal guide surface 58 on the clutch coupling sleeve. The free ends of the baulk pins 52 on the second ratio synchroniser ring 44 do not engage the synchroniser ring 46 for the third ratio gearwheel, however, because this synchroniser ring 46 has L-section cut-out portions 60 preventing such engagement. Alternatively the cut-out portions could be omitted, and the baulk pins 52 could terminate short of the synchroniser ring 46 provided that these baulk pins for the second ratio synchroniser ring 44 extend sufficiently to engage the internal guide surface 58 on the clutch coupling sleeve.

The shank portions of the baulk pins 52 of the second ratio synchroniser ring 44 include adjacent the head portion a portion which is of larger diameter than the free end portion and is separated from the free end portion by a frustoconical baulk shoulder 62. Each of the recesses 54 in the clutch coupling sleeve 22 has a slightly larger internal diameter than the larger-diameter portion of the respective baulk pin 52 and has a frustoconical chamfered baulk shoulder 64 at the axial end adjacent the second ratio synchroniser ring 44 for cooperation with the frustoconical baulk shoulder 62 on the pin. Also, the radially inner portion of each baulk pin is cut away to form a flat portion 66, rotation of this flat portion of the baulk pin being prevented by, during assembly, deforming a part 68 (FIGURE 4) of the head portion into a peripheral groove 70 formed in the adjacent face of the second ratio synchroniser ring 44.

The synchroniser ring 46 for the third ratio gearwheel 12 has three circular apertures 72 which are arranged symmetrically around the synchroniser ring in alternating sequence relatively to the apertures 50 in the second ratio synchroniser ring 44, and serve for the reception of head portions of respective ones of a second set of baulk pins 74 which have shank portions extending axially into and through corresponding ones of a second set of recesses 76 in the clutch coupling sleeve 22. The alternating sequence of the baulk pins 52 and 74 is clearly shown in FIGURE 2. The free end portion of each of the baulk pins 74 on the other axial side of the recess 76 engages a circumferentially extending external guide surface 78 on the clutch coupling sleeve, and the free ends of the baulk pins are in abutting engagement with the second ratio synchroniser ring 44. The shank portions of the baulk pins 74 of the third ratio synchroniser ring 46 include a larger-diameter portion adjacent the head portion and separated from the free end portion by a frustoconical baulk shoulder 80, the second set of recesses 76 in the clutch coupling sleeve 22 each having a slightly larger internal diameter than the larger-diameter portion of the respective baulk pin 74 and having a frustoconical chamfered baulk shoulder 82 at the axial end adjacent the third ratio synchroniser ring for cooperation with the frustoconical baulk shoulder 80 on the baulk pin. The larger-diameter portions of the baulk pins 74 for the third ratio synchroniser ring 46 do not engage the internal guide surface 58 on the clutch coupling sleeve 22 because the clutch coupling sleeve has arcuate cut-out portions 84 (FIGURE 3) preventing such engagement.

The clutch coupling sleeve 22 has an external annular groove 86 between the external guide surface 78 and the recesses 76, with a circular detent spring 88 disposed in the groove and extending into a V-section groove 90 in each of the baulk pins of the third ratio synchroniser ring, the detent spring forming a yieldable connection for the transmission of a limited axial load from the clutch coupling sleeve 22 to the baulk pins 74 of the third ratio synchroniser ring 46. However, the baulk pins 52 of the second ratio synchroniser ring 44 are clear of the detent spring 88 because of the presence of the flat portion 66 at the radially inner side of these pins. Alternatively, instead of having a flat portion, the baulk pins 52 of the second ratio synchroniser ring could have a smaller diameter to provide the desired clearance.

The operation of the clutch coupling arrangement which has been specifically described will now be described with reference to an upchange from second to third ratio. In second ratio the position of the clutch coupling sleeve 22 is to the right of the neutral position shown in FIGURE 1, with the internal splines 26 of the clutch coupling sleeve interconnecting the external dog teeth 28 on the second ratio gearwheel 10 and the external splines on the mainshaft flange portion 20, whereby the mainshaft 14 is caused to rotate at the speed at which the second ratio gearwheel is rotated by its layshaft gear (not shown). Movement of the vehicle gear lever (not shown) for a second-to-third ratio upchange is transmitted through the selector fork (also not shown) to the peripheral groove 24 to move the clutch coupling sleeve 22 initially into the neutral position shown in FIGURE 1 in which the coupling sleeve, and therefore the mainshaft 14, is disconnected from the second ratio gearwheel 10. When the clutch coupling sleeve reaches this neutral position the circular detent spring 88 snaps into the V-section groove 90 in each of the baulk pins 74 for the third ratio synchroniser ring 46, whereupon further axial movement of the clutch coupling sleeve to the left is transmitted through the detent spring and the grooved baulk pins to urge the frustoconical surface 42 of the third ratio synchroniser ring 46 into frictional engagement with the corresponding frustoconical surface 38 of the third ratio gearwheel 12. The frictional engagement of the frustoconical surfaces causes a progressive approach to synchronous rotation of the third ratio gearwheel and the clutch coupling sleeve, which rotates with the mainshaft 14, until the axial force between the clutch coupling sleeve and the third gearwheel is sufficient to cause the detent spring to ride out of the V-section groove. Unless the third ratio gearwheel and the clutch coupling sleeve are in synchronism, however, the baulk pins 74 of the third ratio synchroniser ring remain peripherally misaligned with respect to the second set of recesses 76 in the clutch coupling sleeve 22, with the engagement of the chamfered baulk shoulders 80 and 82 of the respective parts baulking further axial movement of the clutch coupling sleeve. Only when the third ratio gearwheel and the clutch coupling sleeve attain the synchronous condition can the axial force applied to the clutch coupling sleeve cause sufficient relative rotation of the parts to allow the larger-diameter portion of the baulk pins 74 to enter the second set of recesses 76 in the coupling sleeve 22 and thereby allow the internal splines 26 of the clutch coupling sleeve to interconnect the external dog teeth 30 on the third ratio gearwheel 12 and the external splines on the mainshaft flange portion 20, this being the third ratio position of the clutch coupling sleeve.

The operation during a third-to-second ratio downchange is similar except that it is the baulk pins 74 of the third ratio synchroniser ring 46 which apply the axial force from the clutch coupling sleeve 22 to the second ratio synchroniser ring 44, by virtue of the abutting engagement between the free ends of these pins and the second ratio synchroniser ring 44, whereas it is the baulk pins 52 of the second ratio synchroniser ring which baulk movement of the clutch coupling sleeve into the second ratio position until the synchronous condition is attained.

The embodiment of the clutch coupling arrangement shown in FIGURES 5 and 6 is very similar in both construction and operation to the embodiment just described, and like reference numerals are used to identify like parts. One difference is that, in the embodiment shown in FIGURES 5 and 6, the detent spring 188 engages a V-section groove 190 in each of the second ratio baulk pins 152, which are fixed to the second ratio synchroniser ring 144 and abut the third ratio synchroniser ring 146, to which the ungrooved third ratio baulk pins 174 are fixed. Another difference is that in the embodiment shown in FIGURES 5 and 6 the second and third ratio synchroniser rings 144 and 146 both have external frustoconical surfaces 140 and 142 of the same diameter, the second ratio synchroniser ring 144 being made of bronze and its external frustoconical surface 140 being engageable with an internal frustoconical surface 136 of the second ratio gearwheel 10, whereas the third ratio synchroniser ring 146 is made of steel and its external frustoconical surface 142 is engageable with an internal frustoconical surface 139 of a bronze friction ring 195 which is recessed into a carrier 196 bolted to the third ratio gearwheel 12, a circlip 197 adjacent the friction ring limiting axial movement of the third ratio synchroniser ring 146 away from its gearwheel 12. Also, the second and third ratio gearwheels 10 and 12 are mounted on respective sets of needle bearings 198 and 199 on the mainshaft 14. Another difference is that the guide surfaces on the clutch coupling sleeve 22 are internal guide surfaces, namely a guide surface 178 for the second ratio baulk pins 152 and a guide surface 159 for the third ratio baulk pins 174.

The use of a separate set of baulk pins for each synchroniser ring ensures that the mass of one ring does not influence the alignment of the other ring during the frictional engagement of the corresponding frustoconical surfaces. Alignment of each synchroniser ring during frictional engagement is further assisted by the controlling action of the guide surfaces, which in the embodiment shown in FIGURES 1 to 4 comprise one internal surface 78 and one external surface 58 but in the embodiment shown in FIGURES 5 and 6 comprises the internal surfaces 178, and 159. Alternatively, depending on design cosiderations, external guide surfaces could be used for both sets of baulk pins. The good alignment of the synchroniser rings gives efficient synchronisation, even with synchroniser rings which are made narrow in relation to their diameter to keep the overall length of the gearbox short.

Another feature contributing to efficient synchronisation in the embodiments described is the clearance between the detent spring and the baulk pins for the second ratio synchroniser ring. If this clearance were not present the spring would engage these pins and cause undesirable frictional drag during axial movement of the clutch coupling sleeve.

We claim:

1. A clutch coupling arrangement comprising a rotary shaft, first and second gearwheels rotatably mounted at axially spaced positions on the shaft, positive-engagement members on each of the gearwheels, a clutch coupling sleeve slidably mounted on the shaft between the gearwheels, positive-engagement members on the clutch coupling sleeve at both axial ends thereof, means for axially sliding the clutch coupling sleeve into positive engagement with a selected one of the gearwheels, first and second frustoconical surfaces on the first and second gearwheels respectively, first and second synchroniser rings coaxially surrounding the rotary shaft, first and second frustoconical surfaces located on the first and second synchroniser rings respectively for frictional engagement with the respective frustoconical surfaces on the gearwheels, a first set of shouldered baulk pins which extend axially from the first synchroniser ring into corresponding ones of a first set of shouldered recesses in the coupling sleeve, a second set of shouldered baulk pins which extend axially from the second synchroniser ring through corresponding ones of a second set of shouldered recesses in the coupling sleeve into abutting engagement with the first synchroniser ring, and a detent spring spaced from the first set of baulk pins yieldably interconnecting the coupling sleeve and the second set of baulk pins for the transmission of a limited axial load from the coupling sleeve to the second set of baulk pins.

2. A clutch coupling arrangement comprising a rotary shaft, first and second gearwheels rotatably mounted at axially spaced positions on the shaft, positive-engagement members on each of the gearwheels, a clutch coupling sleeve slidably mounted on the shaft between the gearwheels, positive-engagement members on the clutch coupling sleeve at both axial ends thereof, means for axially sliding the clutch coupling sleeve into positive engagement with a selected one of the gearwheels, first and second frustoconical surfaces on the first and second gearwheels respectively, first and second synchroniser rings coaxially surrounding the rotary shaft, first and second frustoconical surfaces located on the first and second synchroniser rings respectively for frictional engagement with the respective frustoconical surfaces on the gearwheels, a first set of shouldered baulk pins which extend axially from the first synchroniser ring into corresponding ones of a first set of shouldered recesses in the coupling sleeve, a second set of shouldered baulk pins which extend axially from the second synchroniser ring through corresponding ones of a second set of shouldered recesses in the coupling sleeve into abutting engagement with the first synchroniser ring, and a circular detent spring which is disposed in an annular groove in the coupling sleeve and extends into a V-section groove in each of the baulk pins of the second set to yieldably interconnect the coupling sleeve and the second set of baulk pins for the transmission of a limited axial load from the coupling sleeve to the baulk pins, each pin of said first set having a flat portion spaced from said spring permitting said sleeve to axially move said spring without said spring contacting the pins of said first set.

3. A clutch coupling arrangement according to claim 2, wherein part of a head portion of each baulk pin of the first set is formed into a peripheral groove in the adjacent face of the synchroniser ring such that rotation of said baulk pins is prevented.

4. A clutch coupling arrangement according to claim 2, wherein a free end portion of each baulk pin of the first and second sets engages a respective guide surface on the clutch coupling sleeve.

5. A clutch coupling arrangement comprising a rotary shaft, first and second gearwheels rotatably mounted at sliding the clutch coupling sleeev into positive engagement members on each of the gearwheels, a clutch coupling sleeve slidably mounted on the shaft between the gearwheels, positive-engagement members on the clutch coupling sleeve at both axial ends thereof, means for axially sliding the clutch coupling sleeve into positive engagement with a selected one of the gearwheels, first and second frustoconical surfaces on the first and second gearwheels respectively, first and second synchroniser rings coaxially surrounding the rotary shaft, first and second frustoconical surfaces located on the first and second synchroniser rings respectively for frictional engagement with the respective frustoconical surfaces on the gearwheels, a first set of shouldered baulk pins which extend axially from the first synchroniser ring into corresponding ones of a first set of shouldered recesses in the coupling sleeve, a second set of shouldered baulk pins which extend axially from the second synchroniser ring through corresponding ones of a second set of shouldered recesses in the coupling sleeve into abutting engagement with the first synchroniser ring, the two sets of shouldered recesses being arranged symmetrically and in alternating sequence around the clutch coupling sleeve, and a circular detent spring which is disposed in an annular groove in the coupling sleeve and extends into a V-section groove in each of the baulk pins of the second set to yieldably interconnect the coupling sleeve and the second set of baulk pins for the transmission of a limited axial load from the coupling sleeve to the last mentioned baulk pins, said baulk pins of said first set being radially spaced from said detent spring.

6. A clutch coupling arrangement according to claim 5, wherein a free end portion of each baulk pin of the first and second sets engages a respective guide surface on the clutch coupling sleeve.

7. In a clutch coupling arrangement in which a clutch coupling sleeve is axially slidable into positive engagement with a selected one of a pair of gearwheels rotatably mounted on the shaft adjacent the respective axial ends of the coupling sleeve, first and second frustoconical surfaces formed on the respective gearwheels, first and second synchroniser rings coaxially surrounding the rotary shaft and formed with respective frustoconical surfaces frictionally engageable with the respective frustoconical surfaces of the gearwheels, first and second sets of shouldered baulk pins projecting from the respective synchroniser rings into respective sets of shouldered recesses disposed symmetrically and in alternating sequence around the clutch coupling sleeve, the second set of baulk pins being in abutting engagement with the first synchroniser ring, a circular detent spring yieldably interconnecting the coupling sleeve and the second set of baulk pins for the transmission of a limted axial load from the coupling sleeve to said second set of baulk pins, each pin of said first set of baulk pins being radially spaced from said spring and having a free end portion spaced from said second synchroniser ring.

8. In a clutch coupling arrangement, first and second axially spaced synchroniser rings, first and second sets of shouldered baulk pins projecting axially inwardly from the respective synchroniser rings with the baulk pins of the second set in abutting engagement with the first synchroniser ring, a clutch coupling sleeve disposed intermediate the synchroniser rings and formed with first and second sets of shouldered recesses for the reception of the respective sets of baulk pins, and a circular detent spring received within a peripheral groove in the coupling sleeve and extending into a groove in each of the baulk pins of the second set for the transmission of a limited axial load from the coupling sleeve to said second set of baulk pins, said first set of baulk pins being radially spaced from said spring permitting said sleeve to axially move said spring without said spring contacting said first set of baulk pins.

9. In a transmission, a rotatable torque transmitting member, first and second spaced gears each having a friction surface formed thereon, friction means for selectively connecting either of said gears to said torque transmitting member, said friction means including spaced first and second members, said first member having a friction surface engageable by the friction surface of said first gear and said second member having a friction surface engageable by the friction surface of said second gear, first projecting means extending from said first member toward said second member and spaced therefrom, said projecting means having shoulder portions formed thereon, second projecting means extending from said second member into engagement with said first member, said last-mentioned projecting means being formed with shoulders thereon, a shiftable member slidably mounted on said torque transmitting member having openings receiving said projecting means and having a surface engageable with the shoulders of said projections in response to predetermined shifting of said shiftable member, said shiftable member being formed with connecting means for engaging and positively connecting either of said gears to said torque transmitting member subsequent to the shifting of said shiftable member past said shoulders of said projections, said shoulders of said projections being effective to prevent engagement of said connecting means until synchronisation of said selected gear and said torque transmitting member has occurred, said shiftable member having yieldable means in engagement with said first projections and spaced from said second projections to reduce frictional drag by said yieldable means as any selected gear is being connected to said torque transmitting member.

10. In a transmission, a rotatable torque transmitting member, a positive clutch coupling mounted for axial movement on said member having axial openings therethrough, spaced first and second gears, a first synchroniser clutch element adjacent to said first gear and a second synchroniser clutch element adjacent to said second gear, first projecting means operatively connected to said first clutch element extending through one of said axial openings and terminating in an end portion axially spaced and disconnected from said second clutch element, second projecting means connected to said second clutch element extending through another of said axial openings for engagement with said first clutch element, yieldable means carried by said coupling for transmitting a selector force applied to said coupling to said second projecting means to effect energization of either of said clutch elements and thereby clutch a selected gear to said torque transmitting member, said coupling and said gears being provided with positive clutch means engageable to selectively connect said coupling and either of said gears, limiting means on said second projection for limiting axial movement of said coupling in one direction to prevent the engagement of said clutch means prior to synchronisation of said second gear and said torque transmitting member and limiting means on said first projection for limiting the axial movement of said coupling in an opposite direction to prevent the engagement of said clutch means prior to synchronisation of said first gear and said torque transmitting means.

References Cited

UNITED STATES PATENTS

| 2,483,841 | 10/1949 | Peterson et al. | 192—53.6 |
| 2,546,746 | 3/1951 | Henning | 192—53.7 |
| 2,573,613 | 10/1951 | Schultze | 192—53.6 |
| 3,221,851 | 12/1965 | Vandervoort | 192—53.6 |

FOREIGN PATENTS

| 1,098,083 | 3/1955 | France. |
| 464,102 | 4/1937 | Great Britain. |

BENJAMIN W. WYCHE III, *Primary Examiner.*

UNITED STATES PATENT OFFICE
CERTIFICATE OF CORRECTION

Patent No. 3,365,039                        January 23, 1968

Thomas Charles Felix Stott et al.

It is hereby certified that error appears in the above numbered patent requiring correction and that the said Letters Patent should read as corrected below.

Column 2, line 6, for "portions" read -- portion --; column 5, line 46, for "cosiderations" read -- considerations --; column 6, line 46, for "formed" read -- deformed --; line 55, for "mounted at sliding the clutch coupling sleeev into" read -- mounted at axially spaced positions on the shaft, --.

Signed and sealed this 25th day of March 1969.

(SEAL)
Attest:

Edward M. Fletcher, Jr.                        EDWARD J. BRENNER
Attesting Officer                              Commissioner of Patents